United States Patent [19]

Honnold

[11] 4,056,149
[45] Nov. 1, 1977

[54] REARWARDLY FOLDING IMPLEMENT

[75] Inventor: Darrel Lee Honnold, Winterset, Iowa

[73] Assignee: Deere & Company, Moline, Ill.

[21] Appl. No.: 665,067

[22] Filed: Mar. 8, 1976

[51] Int. Cl.² .................... A01B 23/04; A01B 73/00; A01B 61/00
[52] U.S. Cl. .................... 172/311; 172/456; 280/411 R
[58] Field of Search .............. 172/311, 456; 280/411 R, 411 A, 412; 56/385

[56] References Cited
U.S. PATENT DOCUMENTS

| | | | |
|---|---|---|---|
| 1,404,544 | 1/1922 | Rettig | 172/456 |
| 2,298,161 | 10/1942 | Robinson | 172/456 |
| 2,727,453 | 12/1955 | Altgelt | 172/454 X |
| 2,901,268 | 8/1959 | Christensen | 172/456 X |
| 3,177,638 | 4/1965 | Johnson | 172/456 |
| 3,428,333 | 2/1969 | Nelson | 172/456 X |
| 3,606,848 | 9/1971 | Dobbs | 172/456 |
| 3,700,040 | 10/1972 | Sosalla | 172/311 |
| 3,791,673 | 2/1974 | Hornung | 172/311 |
| 3,935,696 | 2/1976 | Pavel | 172/456 |

*Primary Examiner*—Richard J. Johnson

[57] ABSTRACT

A rearwardly folding multi-sectional implement includes a U-shaped center section and lockable wing linkage structure for securing the wing sections in either their operational or transport position. A resilient pad is provided to permit limited lateral movement of the wing during transport.

12 Claims, 4 Drawing Figures

REARWARDLY FOLDING IMPLEMENT

BACKGROUND OF THE INVENTION

The present invention relates generally to foldable multisectional agricultural implements and more specifically relates to rear folding implements having means thereon to automatically secure the folded sections in either an operative or transport configuration.

Modern agricultural implements are becoming larger and wider as the profits a farmer is able to realize become more dependent upon his ability to realize higher levels of productivity. Naturally as these implements increase in size, they become much more difficult to store and transport.

To overcome the problems inherent in storing and transporting large and wide implements, several approaches have been utilized. For example, some implements are folded upwardly to reduce the transport width and depth. Other implements provide means for folding the sections forwardly while yet other approaches utilize rearwardly folding wing sections.

Upwardly folding implements are limited both with respect to the weight which can be lifted to a vertical position and the ultimate height which can be tolerated during transport. Further, such implements must provide means for stabilizing the tool-laden and elevated center sections during the transport operation.

Forwardly folding implements often require various means to secure the folded wing sections to the tractor to minimize skidding and tracking problems encountered during turning maneuvers.

Many multi-sectional agricultural implements utilize rear folding wing sections to reduce the width required for transport and storage. Unless some provision is made for eliminating the interference between the tools adjacent pivotal connections, the tools must be removed. One approach to solving this interference problem provides for rotation of the tools to an elevated position prior to folding of the implement sections to eliminate interference. Such a solution, however, requires expensive hydraulic systems and additional manufacturing as well as maintenance expenses. A further problem encountered with existing rear fold implements involves steering during transport operations. Rearwardly folded wing sections often tend to swing excessively during turning unless they are latched together with some rigid means. Those means provided today for latching the folded sections together are manual and require the operator to leave his cab to latch and unlatch the sections. Further, these means are rigid and do not permit the trailing sections to track during turning maneuvers, but thereby often cause the sections to skid.

SUMMARY OF THE INVENTION

Applicant's invention has overcome the above-mentioned problems and provides a rear folding multi-sectional implement frame which eliminates interference between tools adjacent sectional pivotal joints and can be automatically latched in either the operative or transport position.

It is a primary object of the present invention to provide a means for folding and unfolding large and heavy agricultural wing sections.

It is further an object to provide means for automatically securing the wing sections in either their operative or transport configuration.

It is yet another object of the present invention to provide a rear folding implement which eliminates tool interference at the joints between the sections.

Another object of the present invention is to provide means to minimize skidding of the trailing wing sections during transport turning maneuvers.

Yet another object of the present invention is to provide the locking means with some degree of yieldability to avoid structure failure of the mechanism during operation and transport.

DESCRIPTION OF THE PREFERRED EMBODIMENT

Figure 1:
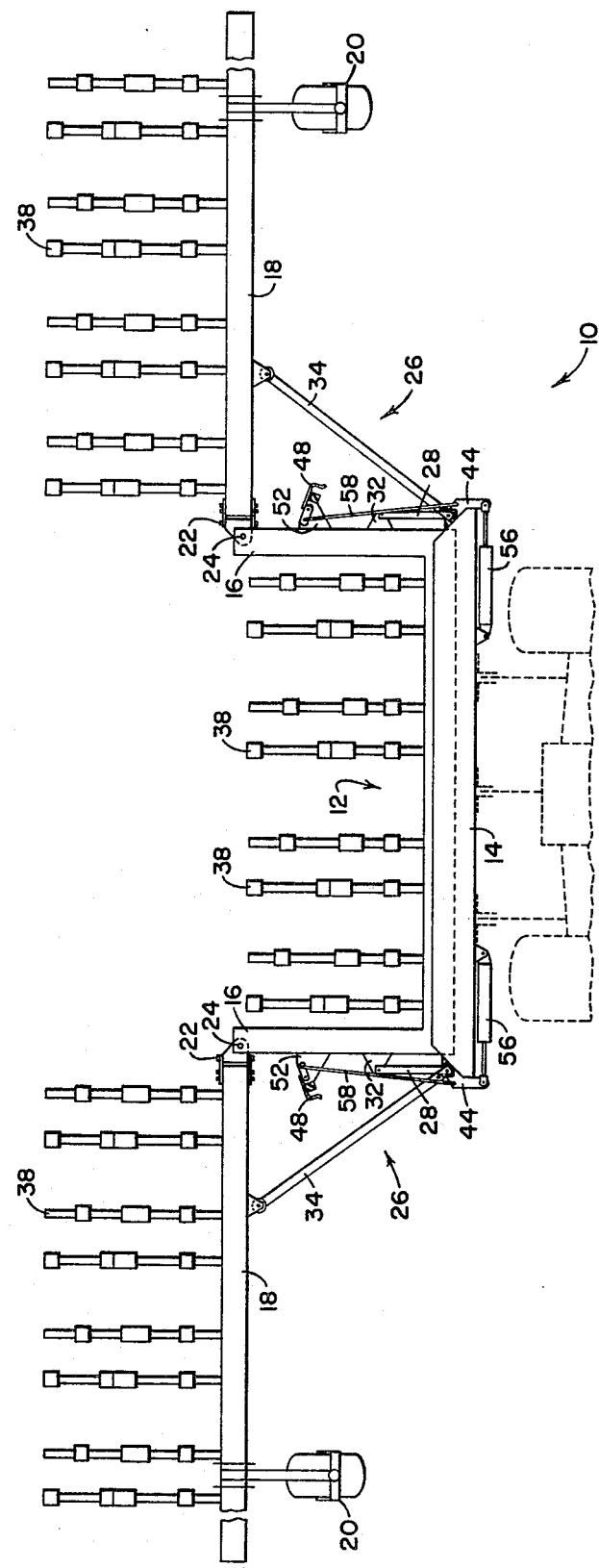
FIG. 1 is a plan view of a three-sectioned implement embodying the invention.

Referring now to the drawings and in particular to FIG. 1, there is illustrated a multi-sectional implement indicated generally at 10, having a U-shaped center frame or section 12 with a central transversely extending structural member 14, a pair of transversely spaced rearwardly extending leg members 16 and outer frames or side sections 18. Each side section 18 includes a caster wheel 20 which permits that section to be easily moved between transverse operational and rearwardly extending transport positions. Coupling each side section 18 with its respective center section leg member 16 are horizontally extending pivot pins 22 and vertically extending rear pivot pins 24, the latter being treated as rear pivot means on the ends of the central frame 12.

Figure 3:
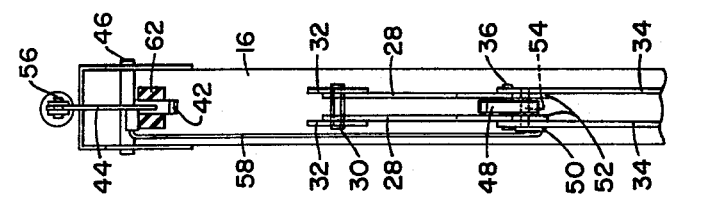
FIG. 3 is a partial side view of the invention illustrating the latching mechanism.
Figure 2:
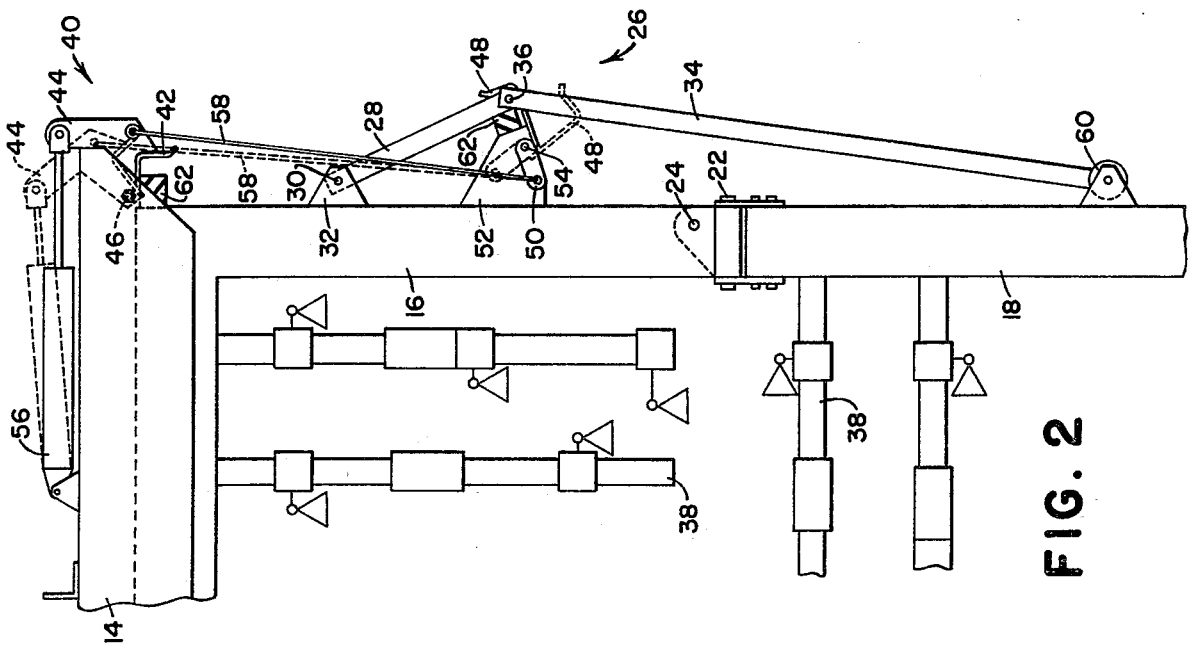
FIG. 2 is an enlarged plan view of the folding linkage and latching mechanism as positioned when the wing sections are in the transport position.

As is best seen in FIGS. 2 and 3, a linkage structure 26 is provided between each leg member 16 and its respective side section 18 to secure that side section 18 in either its operational or transport configuration. While the illustrated linkage structures 26 in FIGS. 2 and 3 include a pair of first rigid links 28 pivotally connected to a front pivot pin 30 and carried by ear 32 which projects from leg or structural member 16, a single first link 28 would provide a workable mechanism. Each first link 28 is rotatably connected with its respective leg member 16 for rotational movement about a vertical axis between forwardly folded and rearwardly extending positions. A pair of second rigid link members 34 have their one end universally connected with the forward edge of the side section or outer frame 18 and their other end connected with the first link 28 by pin member 36. Similarly only a single second link is required for the invention.

Tools 38, which are shown as cultivator shovels but which may be of any other variety such as planters, chisel plows, rod weeders etc., are carried on the forward beam or structural member 14 and project rearwardly into a tool-receiving area defined by the front structural member 14 and the side structural members 16 of the central frame. Similar tools 38 are carried on and extend rearwardly from outer frames 18.

A locking means 40 engageable with each first rigid link 28 is carried by leg member 16 to secure the first link 28 in either its forwardly folded or rearwardly extended position. In the preferred embodiment, the locking means 40 includes a first forward latching member 42 carried by an L-shaped arm 44. The arm 44 in turn is pivotally connected to the outer section 12 by a vertical pivot pin 46 positioned forwardly of the link pivot pin 30. A second latching member 48 is included in the locking means 40 to secure the link 28 in its rearwardly extended position. The second latching member 48 is carried by the arm 50 which in turn is pivotally connected to ear 52 by vertical pivot pin 54. As will later become apparent, it is important that the pin 54 supported by the ear 52 be transversely offset sufficiently to be outwardly positioned relative to the vertical pivot pin 24.

Figure 4:
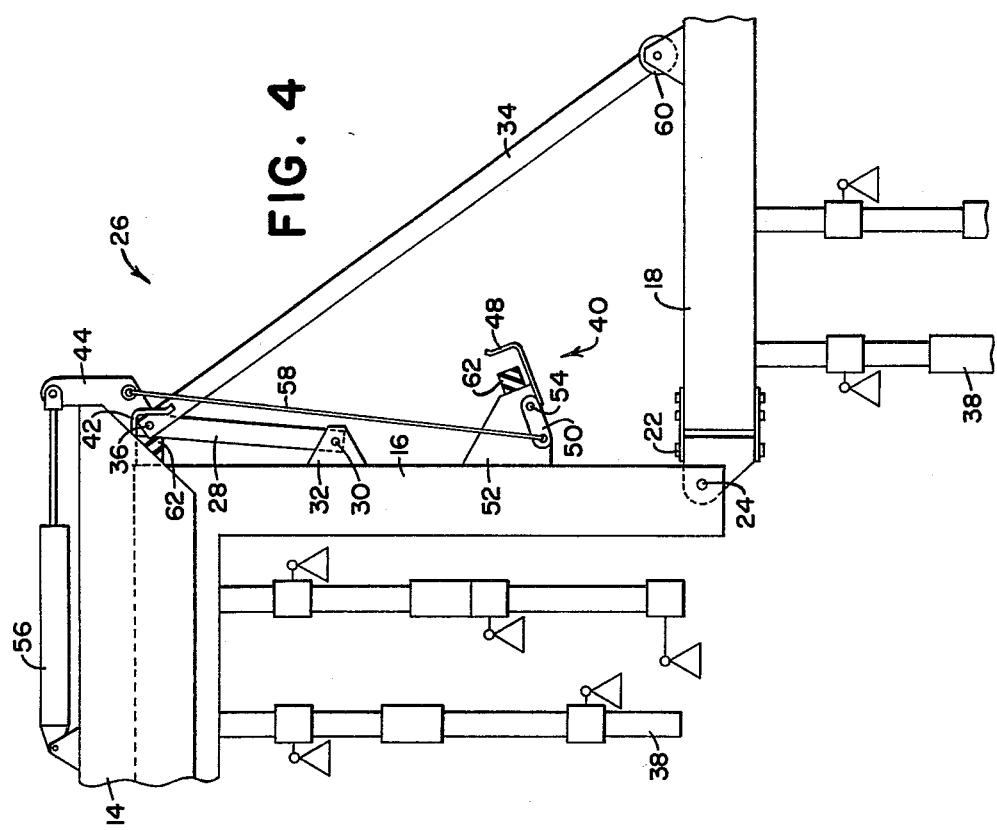
FIG. 4 is an enlarged plan view of the folding linkage and latching mechanism as positioned when the wing sections are in the transverse operational position.

A latch activating hydraulic cylinder 56 has its base end connected to the central transverse member 14 and its ram end connected to the first activating arm 44. Interconnecting the arms 44 and 50 and their respective latches 42 and 48 for simultaneous movement is a rigid rod 58. As can be observed from FIGS. 2 and 4, both arms 44 and 50 will be moved to either their opened or closed positions as the hydraulic cylinder 56 is retracted and expanded. In this way the operator need activate the latching mechanism only to open the latches 42 and 48 so that the side frames 18 can be shifted to their other position where the latches 42 and 48 can then be closed.

In operation the linkage 26 is as illustrated in FIGS. 1 and 3 and the wing sections 18 are transversely aligned and offset rearwardly from the central transverse member 14. In this position the latch member 42 secures the first link 28 in its forwardly position and the second link 34 acts under tension to secure each wing section 18 in its transversely aligned position. The horizontally positioned hinge pivot pins 22 permit each wing section 18 to ride over ground contours different than those encountered by the center 12 or outer wing sections 18. To avoid structural damage to the second link 34 during movement of the wing section 18 over such ground contours, a ball joint 60 is provided between the second rigid link 34 and its respective wing section 18.

To fold the wings rearwardly for transport, the latch arms 42 and 48 are rotated, by hydraulic cylinder 56, to unlatch link pin 36 and the implement is then moved slowly ahead. As the implement is advanced, the wing sections 18 supported on caster wheels 20 swing around behind the center section 12. With the U-shaped center section tools 38 mounted on the transverse forward portion of the center section 12, tool interference is eliminated at the hinge joints between the center section 12 and the respective wing sections 18 as the wing sections 18 move into their transport position.

As each wing section 18 is slowly moved into fore-and-aft trailing positions, the links 28 and 34 move to an extended condition until the first link 28 is moved into abutment with a resilient pad 62 mounted on the ear 52 of the leg member 16. At this time the operator will then activate the latching rod 58 to lock the swinging end of the first link 28 into its rearward position and to secure the wing section 18 in its transport position. It is important that the ear or bracket 52 positions its pad 62 and latch 48 in a transverse outward offset relation with respect to the beam 16 and its rear pivot 24. This causes the adjoining ends of links 28 and 34 to be offset from the pivot 24 and the link 34 to be at an angle to the outer frame 18 when the latter is in fore-and-aft disposition. This restricts the outer frame 18 against lateral shifting and thus prevents the tools 38 on the outer frames 18 from interferring with those on the central frame 12.

In this position the second rigid link 34 will hold the trailing side section 18 in position since the forward end of the second link 34 is locked against movement by the rearward latch member 48. However, it is desirable that each outer frame or trailing wing section 18 be able to swing transversely to some degree. Otherwise, the sections 18 will skid rather than trail during turning maneuvers and possibly cause a loss of steering control by the operator. To overcome this problem, the resilient pad 62 between each leg member 16 and the first rigid link 28 permits the linkage 26 to move slightly during transport as the wing section 18 encounters ground contour changes or the implement is turned.

With the locking linkage provided, an operator need not leave his tractor to fold or latch the sections into either operating or transport position. Neither must he transport bars or links to lock the wing sections into place for transport as is required with many of today's foldable implements.

I claim:

1. A mobile foldable sectional agricultural implement adapted to be pulled by a traction vehicle, comprising: a transverse center section with a forwardly projecting hitch means adapted for connection to a traction vehicle and having rearwardly extending leg members; transversely aligned side sections universally connected to the rearward portions of the leg members to swing between transversely extending and fore and aft extending positions with respect to the leg members; a first rigid link pivotally connected with each leg member forwardly of the aforesaid rearward portion for rotation about a vertical axis between a forwardly directed position and a rearwardly extending position in which the respective side section extends fore and aft; a second rigid link universally connecting each side section with the first link of its respective leg member; and a releasable locking means on the respective leg member for each first rigid link that engages and secures the latter after it has moved to its forwardly and rearwardly extending position.

2. The invention defined in claim 1 wherein the first and second links swing horizontally and the implement is further characterized as having resilient bumpers between the links and their respective leg members that are engageable when the first link is at its forwardly and rearwardly extending positions.

3. The invention defined in claim 1 wherein the locking means includes a pair of latch members carried by each leg member, one latch member engageable with the first link when said link moves to its forwardly extending position, and a second latch member engageable with said link when it moves to its rearwardly extending position.

4. The invention defined in claim 1 wherein the locking means includes latching members and the latter are hydraulically operated to engageably couple said first links with their respective leg member when the latter are swung to their forwardly and rearwardly extending positions.

5. A mobile foldable sectional agricultural implement adapted to be pulled by a traction vehicle, comprising: a U-shaped center section including rearwardly extending leg members; a transversely extending side section universally secured to each leg member; a first rigid link pivotally secured to each leg member forwardly of the side section and rotatable about a vertically extending axis between forwardly and rearwardly extending positions; a second rigid link universally connecting each first rigid link with its respective side section; a first latching member rotatably secured with each leg member forwardly of the first rigid link pivotal connection, and engageable with the first rigid link when said link is in its forwardly extending position; a second latching member rotatably secured with each leg member rearwardly of the first rigid link pivotal connection and engageable with the first rigid link when said link is in its rearwardly extending position; and a resilient member secured to each leg member rearwardly of the first rigid link pivotal connection, and engageable with that leg member's respective first rigid link when said link is in its rearwardly extending position.

6. A foldable agricultural implement adapted to be pulled by a tractor comprising: a central frame having a pair of transversely spaced rearwardly projecting sections interjoined at their forward ends by a tool-carrying central section; tool-carrying outer frames having inner ends universally connected to and extending outwardly from rear portions of said rearwardly projecting sections to swing between transversely extending and fore and aft extending positions with respect to the rearwardly projecting sections; linkage means extending between each rearwardly projecting section and the respective outer frame, each linkage means comprising a pair of links having adjoining ends and vertically pivotally connected at their respective opposite ends to the respective outer frame and to the respective rearwardly projecting section forwardly of the inner ends of the respective outer frame; and latch means on said central frame engageable with the respective pairs of links to hold said links after they are shifted to a first folded condition in which the respective outer frames are disposed transversely with respect to said respective rear portions of the rearwardly projecting sections and after they are shifted to a second extended condition in which the respective outer frames are disposed fore and aft and in trailing relation with respect to said respective rear portions of the rearwardly projecting sections.

7. The invention defined in claim 6 in which the outer frames are universally connected to the respective rearwardly projecting section by joints that include vertical pivots, and characterized by the latch means holding said adjoining ends of the respective links in a transverse offset relation to said pivots when the links are in their extended condition.

8. A foldable agricultural implement adapted to be pulled by a tractor comprising: a U-shaped central frame having a transversely extending tool-carrying central section with hitch means adapted for connection to a tractor and a pair of transversely spaced rearwardly projecting sections interjoined at their forward ends by the transversely extending tool-carrying central section and defining therewith a tool-receiving area; tool members supported on and extending rearwardly from the central section into said area; tool-carrying outer frames extending outwardly from and pivotally connected to rear portions of said rearwardly projecting sections to swing between fore and aft and transversely extending positions with respect to the rearwardly projecting sections; vertical pivots mounted on each of the rearwardly projecting sections forwardly of the aforesaid rear portions; linkage means extending between each rearwardly projecting section and the respective outer frame, each linkage means comprising a pair of links having adjoining ends and pivotally connected at their respective opposite ends to the respective vertical pivots on the rearwardly projecting sections and outer frames; and releasable latch means on said central frame engageable with the respective pairs of links to secure said links in first folded conditions after the respective outer frames are moved to their transversely extending positions and second extended conditions after the respective outer frames are moved to their fore and aft extending positions, said latch means including abutment means for each of said pairs of links spaced transversely outwardly from the rearwardly projecting sections and engageable with the respective linkage means so as to hold the respective link connected to the respective outer frame at an angle to said frame when the links are in their extended condition.

9. A foldable agricultural implement adapted to be pulled by a tractor comprising: a tool-carrying central frame with a forwardly projecting hitch means for connecting it to a tractor, said central frame having transversely spaced opposite ends and having front and rear vertical pivots adjacent each end; a tool-carrying outer frame connected to each of the rear vertical pivots; linkage means extending between said central frame and each outer frame, each linkage means comprising a pair of links vertically pivotally joined at adjoining ends and vertically pivotally connected at their respective opposite ends to the front pivots and outer frame respectively so as to permit said links of said linkage means to swing in a generally horizontal plane as the linkage means folds and extends; a first latch adjacent each end of said central frame engageable with the respective linkage means to hold said links in first folded conditions after the respective outer frames are moved to be disposed transversely; and a second latch adjacent each end of said central frame engageable with the linkage means to hold said links in a second extended condition after the respective outer frames are moved to be disposed fore and aft and in a trailing relation with respect to its rear vertical pivot.

10. The invention defined in claim 9 further characterized by the first and second latches being interconnected to operate in unison to simultaneously and alternately move the respective latches to latched and unlatched positions.

11. A foldable agricultural implement comprising: a tool-carrying central frame having transversely spaced fore and aft structural members at opposite ends and having front and rear vertical pivots adjacent each end; a tool-carrying outer frame connected to each of the rear vertical pivots; linkage means disposed outboard of each of the structural members and extending between said central frame and each outer frame, each linkage means comprising a pair of links having adjoining ends and vertically pivotaly connected at their respective opposite ends to the front pivots and outer frame respectively; a first latch supported on the central frame forwardly of the front pivot adjacent each end of said central frame, said latch being engageable with the respective linkage to hold said links in first folded conditions in which the respective outer frames are disposed transversely; and a second latch supported on the structural member at each end of said central frame, and engageable with the respective linkage means at that end to hold the links in a second extended condition in which the respective outer frames are disposed fore and aft, each of said second latches being transversely outwardly offset with respect to the rear vertical pivot so that the link that extends from the adjoining ends of the respective pair of links is inclined to the outer frame when the links are in their extended condition.

12. A foldable agricultural implement comprising: a tool-carrying central frame having transversely spaced opposite ends and composed of a transverse horizontal tool-carrying structural member and fore and aft structural members rigidly joined at their forward ends by the transverse structural member and defining with the latter an area in which tools carried by the central structural member may reside; front and rear vertical pivots adjacent each end; said rear pivots being supported on the rear ends of the fore and aft structural member; tool-carrying outer frames connected to each of the rear vertical pivots; linkage means extending between said central frame and each outer frame, each linkage means comprising a pair of links having adjoining ends and vertically pivotally connected at their respective opposite ends to the front pivots and outer frames respectively; a first latch adjacent each end of said central frame engageable with the respective linkage means to hold said links in first folded conditions in which the respective outer frames are disposed transversely; and a second latch adjacent each end of said central frame engageable with the linkage means to hold said links in a second extended condition in which the respective outer frames are disposed fore and aft; and the link of each pair of links that extends between each of the adjoining ends of the link and the respective outer frame being at an angle to the frame when the links are in both their folded and extended conditions.

* * * * *